Mar. 20, 1923.
A. L. CONLEY
AUTOMOBILE RIM TOOL
Filed Dec. 22, 1920
1,449,268
2 sheets-sheet 1
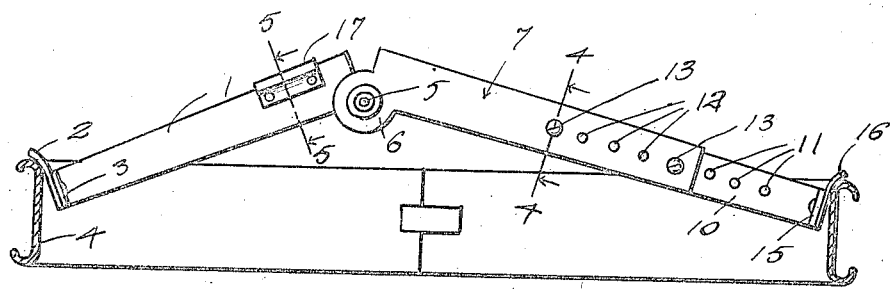
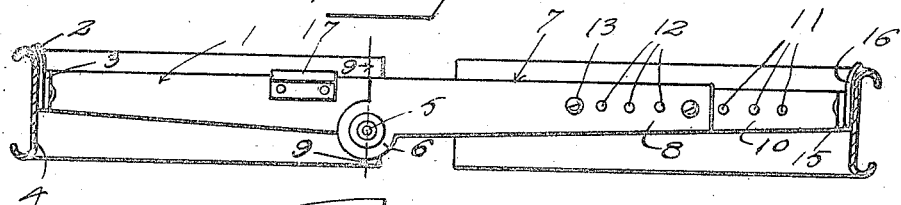
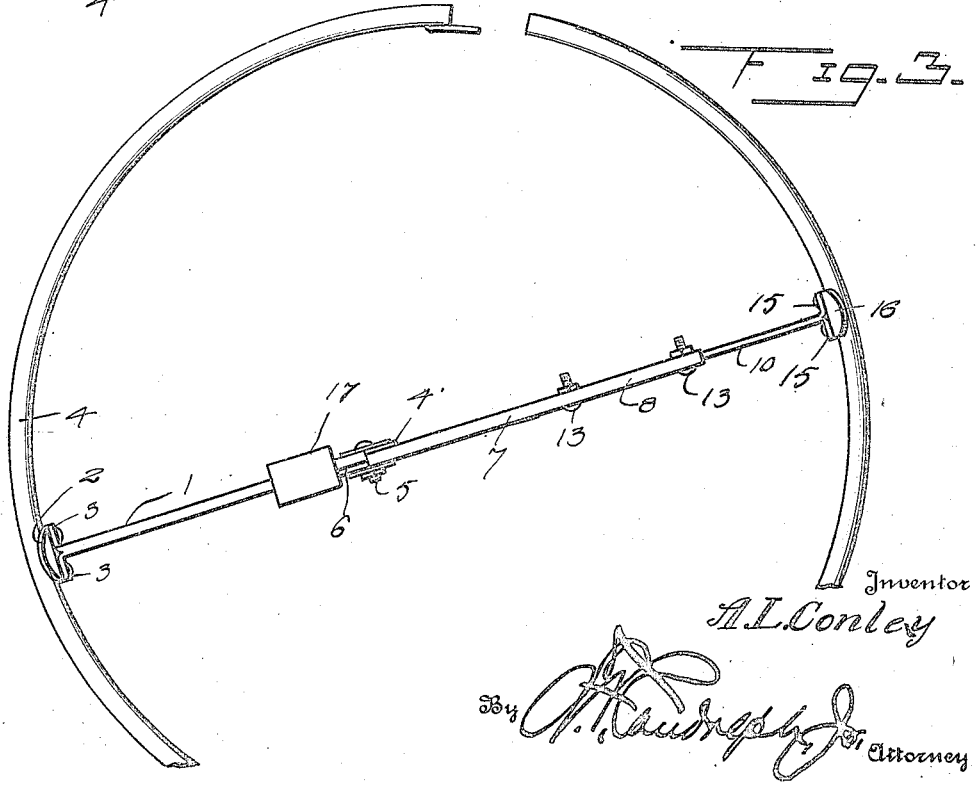
Inventor
A. L. Conley
By ... Attorney Mar. 20, 1923.  A. L. CONLEY  1,449,268
AUTOMOBILE RIM TOOL
Filed Dec. 22, 1920   2 sheets-sheet 2
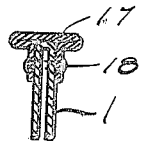
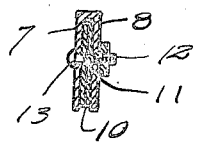
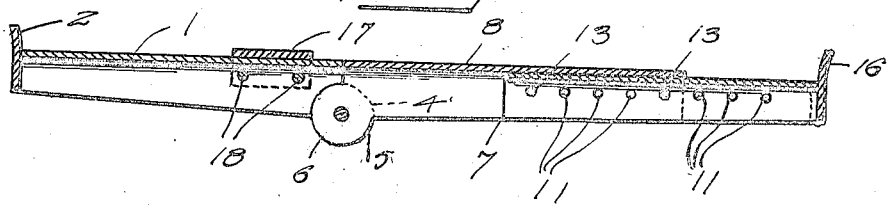
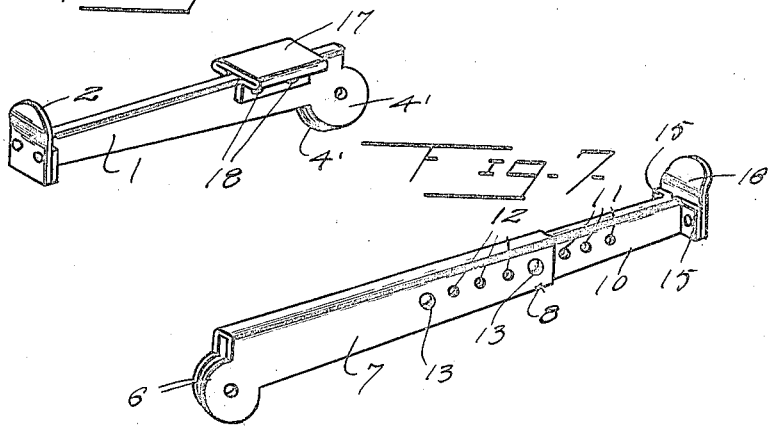
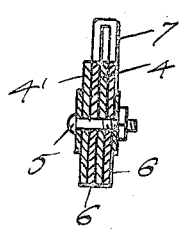
Inventor
A. L. Conley
By
Attorney Patented Mar. 20, 1923.

1,449,268

UNITED STATES PATENT OFFICE.

ABRAHAM L. CONLEY, OF SALT LAKE CITY, UTAH.

AUTOMOBILE RIM TOOL.

Application filed December 22, 1920. Serial No. 432,479.

*To all whom it may concern:*

Be it known that I, ABRAHAM L. CONLEY, a citizen of the United States, residing at Salt Lake City, in the county of Salt Lake and State of Utah, have invented certain new and useful Improvements in Automobile Rim Tools; and I do hereby declare the following to be a full, clear, and exact description of the invention, such as will enable others skilled in the art to which it appertains to make and use the same.

This invention relates to certain new and useful improvements in an automobile rim tool and has for its primary object the provision of a tool of the character stated which is especially adapted for expanding a transversely split rim to lock together or unlock the ends of the rim with the least difficulty.

The invention has for a still further object the provision of a tool of the character stated which will be composed of the minimum number of parts and which may be readily adjusted for rims of various diameters and which may be readily applied to the rim and then expanded to force away from one another opposite portions of the rim and thereby expand the latter or which may be readily removed by breaking the joint or connection of the members of the tool.

With the foregoing and other objects in view as will appear as the description proceeds the invention consists in the novel construction, combination and arrangement of cooperating elements as hereinafter more specifically set forth, claimed and shown in the accompanying drawings forming a part of the present application and in which:

Figure 1 is a transverse section through a rim with the improved tool positioned upon the same.

Figure 2 is a view similar to Figure 1 showing the tool in its operative position.

Figure 3 is an elevation of the rim with the tool in its operative position thereon and the ends of the transversely split rim separated, a tire being also in position upon the rim.

Figure 4 is a detail transverse section on the plane of the line 4—4 of Figure 1, looking in the direction indicated by the arrows.

Figure 5 is a transverse section on the plane of line 5—5 of Figure 1, looking in the direction indicated by the arrows.

Figure 6 is a central longitudinal section through the complete device.

Figure 7 is a detail perspective view of the adjustable section of the tool and showing the construction of the rim engaging foot.

Figure 8 is a detail perspective view of the non-adjustable section of the tool.

Figure 9 is a detail sectional view on the plane of line 9—9 of Figure 2, looking in the direction indicated by the arrows.

Referring more in detail to the drawings in which similar reference characters designate corresponding parts throughout the several views, 1 indicates the comparatively short non-adjustable section of the tool which has a foot 2 fastened to lateral flanges 3 integral with section 1 and formed by splitting the same and bending portions thereof outwardly. The foot 2 as shown is curved or deflected upwardly and outwardly so that the tool will be initially supported as in Figure 1 and will not be displaced incidental to downward movement in positioning of the shoe. This makes a foot which may be readily engaged with the side of the tire rim 4 or the like, as will be readily understood. The section 1 also has a pair of downwardly offset perforated ears 4 at its inner end and which are positioned parallel to receive the pivot pin 5 which also passes through a pair of perforated downwardly extended ears 6 carried by the main member 7 of the adjustable section of the tool. This adjustable section 7 is also formed of a substantially U-shaped member so as to provide a double thickness and the ears 6 are positioned so that one of these ears will be between the ears 4 and the other ear 6 on the outside of one of the ears 4. This will provide a strong pivot connection and owing to the construction of the sections 1 and the extensible section which will be designated in general by the numeral 8, the tool will have the maximum strength and therefore will be highly efficient in use.

The main member 7 of the section 8 is adapted to slidably receive the extension member 10. This member 10 is provided with a plurality of transverse openings 11 adapted to register with corresponding openings 12 in the member 7 whereby securing bolts 13 or the like may be inserted through the registering openings 11 and 12 to retain the adjustable or extension member 10 in adjusted position. The member 10 has opposite extended flanges 15 at its outer or free end and upon which the shoe 16 is mounted. This shoe corresponds with the shoe plate 3 and therefore is curved longitudinally or vertically so as to engage properly the tire rim 4, when the tool is adjusted to the proper length of the rim.

The comparatively short stationary section 1 of the tool has a foot piece 17 mounted on its upper edge adjacent its inner end or pivotal end and which foot piece is preferably formed of a piece of metal or the like bent to form a flat foot receiving member over the upper edge of the section 1 of the tool, the side edges of the metal being extended toward one another and then extended in parallel relation and secured to the opposite side faces of the section 1, as clearly shown at 18.

From the foregoing paragraphs taken in connection with the accompanying drawings, the complete construction of this device in its preferred form should be clearly understood by parties familiar with this art. It may be stated, however, that when it is desired to employ this tool for expanding the tire rim 4 when separating or endeavoring to lock together the ends of the transversely split rim, the tool is placed in the position shown in Figure 1 of the drawings with the joint thereof broken. It is then simply necessary to press the foot upon the foot piece 17 and thereby force the sections 1 and 7 into alinement, thereby causing the seats 3 and 16 to force opposite portions of the rim 4 outwardly and separate the ends of the split rim 4, as shown in Figures 2 and 3 of the drawings. It will be evident that the hinge or the joint may be readily broken by pulling outwardly upon the foot piece 17 and the tool then removed from the rim 4, permitting movement of the separated ends of the rims 4 toward one another.

It is believed that the complete operation as well as the construction of the tool may now be readily understood without further detail description. It is also evident that while the preferred embodiment of the invention has been shown and described, minor changes in the details of construction and arrangement of parts may be resorted to within the scope of what is claimed without departing from the spirit of the invention.

What is claimed is:—

A tire rim tool having a first section and a second section both of substantially U-shape in cross section and movable into alinement to spread a rim, said sections at adjacent ends having interfitting ears, means pivotally connecting said ears together, an extension slidable in the groove of the first section, securing means passing through the first section and extension to secure the latter in adjusted positions and to reinforce the first section, the second section and extension adjacent to their free ends having laterally extending flanges respectively integral therewith, rim-engaging feet secured one to the flanges of the second section and one to the flanges of the extension, a foot piece of substantially U-shape in cross section disposed on the second section and engaging the opposite walls thereof, and fastening means for the foot piece passing through said walls to reinforce them.

In testimony whereof I affix my signature in presence of two witnesses.

ABRAHAM L. CONLEY.

Witnesses:
LEA W. LOTT,
G. L. HUTCHINS.